United States Patent
Taga

(10) Patent No.: US 11,180,933 B2
(45) Date of Patent: Nov. 23, 2021

(54) MOTOR-VEHICLE DOOR LATCH DEVICE

(71) Applicant: MITSUI KINZOKU ACT CORPORATION, Yokohama (JP)

(72) Inventor: Takao Taga, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 682 days.

(21) Appl. No.: 16/069,639

(22) PCT Filed: Feb. 2, 2016

(86) PCT No.: PCT/JP2016/053114
§ 371 (c)(1),
(2) Date: Jul. 12, 2018

(87) PCT Pub. No.: WO2017/134756
PCT Pub. Date: Aug. 10, 2017

(65) Prior Publication Data
US 2019/0032373 A1 Jan. 31, 2019

(51) Int. Cl.
*E05B 77/06* (2014.01)
*B60J 5/00* (2006.01)
(Continued)

(52) U.S. Cl.
CPC .............. *E05B 77/06* (2013.01); *B60J 5/00* (2013.01); *E05B 85/02* (2013.01); *E05B 85/26* (2013.01); *E05B 79/04* (2013.01)

(58) Field of Classification Search
CPC .............................. E05B 77/06; Y10S 292/22
See application file for complete search history.

(56) References Cited

U.S. PATENT DOCUMENTS 8,764,077 B2 * 7/2014 Takagi ............... E05B 77/06
292/336.3
9,243,429 B2 * 1/2016 Bendel ............... E05B 77/06
(Continued)

FOREIGN PATENT DOCUMENTS

| JP | 5285524 B2 | 9/2013 |
| JP | 2014-510203 A | 4/2014 |
| WO | 2014/135142 A1 | 9/2014 |

OTHER PUBLICATIONS

International Search Report Corresponding to PCT/JP2016/053114 dated May 10, 2016.
(Continued)

*Primary Examiner* — Christine M Mills
*Assistant Examiner* — Noah Horowitz
(74) *Attorney, Agent, or Firm* — Finch & Maloney, PLLC; Michael J. Bujold; Jay S. Franklin

(57) ABSTRACT

A motor-vehicle door latch device having a latch releasing member and a stopper which are rotatably supported on a base member by each shaft. The stopper holds the latch releasing member so as not to rotate in a releasing direction by rotating from a regular position to a lock position, due to an action of an inertial force caused by an impact force which is received from a first direction corresponding to a direction in which a striker enters an entrance groove. The latch releasing member has a center of gravity which deviates from its rotation center so that another inertial force, caused by another impact force which is received from a second direction opposite the first direction, acts in an opposite direction to the releasing direction.

4 Claims, 13 Drawing Sheets

(51) Int. Cl.
*E05B 85/26* (2014.01)
*E05B 85/02* (2014.01)
E05B 79/04 (2014.01)

(56) References Cited

U.S. PATENT DOCUMENTS

| | | |
|---|---|---|
| 9,580,938 B2 | 2/2017 | Bendel et al. |
| 10,024,083 B2* | 7/2018 | Bejune ................... E05B 77/06 |
| 2015/0240536 A1* | 8/2015 | Cumbo ................... E05B 77/06 |
| | | 292/200 |
| 2015/0315824 A1 | 11/2015 | Gotzen et al. |
| 2016/0010363 A1 | 1/2016 | Wahmann et al. |

OTHER PUBLICATIONS

Written Opinion Corresponding to PCT/JP2016/053114 dated May 10, 2016.

\* cited by examiner

(In a Case That Impact from Outside Affects Right Side Face of Vehicle Body)

|  | Left Door 100L | Right Door 100R |
|---|---|---|
|  | Effects of Inertial Force | Effects of Inertial Force |
| Outside Handle | Not Displaced | Not Displaced |
| Inside Handle | Door Opening Operation Direction | Not Displaced |
| Latch Releasing Member 60 | Latch Releasing Direction | Engaging Direction |
| Stopper 8 | Displaced to Lock Position | Not Displaced |

(b)

(In a Case That Impact from Outside Affects Left Side Face of Vehicle Body)

|  | Left Door 100L | Right Door 100R |
|---|---|---|
|  | Effects of Inertial Force | Effects of Inertial Force |
| Outside Handle | Not Displaced | Not Displaced |
| Inside Handle | Not Displaced | Door Opening Operation Direction |
| Latch Releasing Member 60 | Engaging Direction | Latch Releasing Direction |
| Stopper 8 | Not Displaced | Displaced to Lock Position |

(c)

(In a Case That Inertial Force Affects Doors Downward)

|  | Left Door 100L | Right Door 100R |
|---|---|---|
|  | Effects of Inertial Force | Effects of Inertial Force |
| Outside Handle | Not Displaced | Not Displaced |
| Inside Handle | Not Displaced | Not Displaced |
| Latch Releasing Member 60 | Engaging Direction | Engaging Direction |
| Stopper 8 | Not Displaced | Not Displaced |

(d)

(In a Case That Inertial Force Affects Doors Upward)

|  | Left Door 100L | Right Door 100R |
|---|---|---|
|  | Effects of Inertial Force | Effects of Inertial Force |
| Outside Handle | Not Displaced | Not Displaced |
| Inside Handle | Not Displaced | Not Displaced |
| Latch Releasing Member 60 | Latch Releasing Direction | Latch Releasing Direction |
| Stopper 8 | Displaced to Lock Position | Displaced to Lock Position |

MOTOR-VEHICLE DOOR LATCH DEVICE

TECHNICAL FIELD

The present invention relates to a motor-vehicle door latch device, particularly relates to a motor-vehicle door latch device which prevents a door from opening when affected by an impact due to a side crash accident and so on.

BACKGROUND OF THE INVENTION

As a conventional invention which is intended to prevent a vehicle door from opening when a vehicle body or the door is affected by an impact due to a side crash accident and so on, for example, an invention described in JP 5285524 B is exemplified.

The invention described in JP 5285524 B relates to a door latch device fixed to a door which is supported on a side of a vehicle body so as to open and close in a transverse direction of a vehicle, wherein the door latch device has a formation that an inertia lever which can swing from an initial position to a swing position around a support shaft in a longitudinal direction of a vehicle is rotatably supported by a lifting lever which can be displaced by door opening operation of an outside handle provided on a vehicle outside face of the door or an inside handle provided on a vehicle inside face of the door. Thus, even if the door or the vehicle body is affected from the outside by an impact due to a side crash accident and so on, and the outside handle is displaced in an opening operation direction by an inertial force caused by the impact, a release operation of the lifting lever accompanied with the displacement of the outside handle in the door opening operation direction is blocked so as not to transmit to a ratchet (a "pole" in JP 5285524 B) by the inertia lever which is swung from the initial position to the swing position against a biasing force of a spring by the inertial force caused by the impact. Therefore, the door latch device prevents the door from opening made against an occupant's intention.

SUMMARY OF THE INVENTION

However, the invention described in JP 5285524 B is insufficient to prevent the latch from releasing. The inertial force caused by the impact from the outside naturally affects the ratchet which is a mass body regardless whether a locking/unlocking mechanism of the door latch device is in an unlock state or a lock state. In this case, when a center of gravity of the ratchet is positioned to deviate from a rotation center of the ratchet, there is a risk that if the ratchet is affected by the inertial force, the ratchet is affected by a moment of inertia in a latch releasing direction according to a direction of the inertial force so that a release operation for releasing the ratchet from the latch is caused, and thereby releasing the door against an occupant's intention.

In view of the above disadvantages, an object of the present invention is to provide a motor-vehicle door latch device which prevents a latch releasing member from a release operation when affected by an impact.

The above problems are solved by the present invention as follows.

A motor-vehicle door latch device comprising:

a base member fixed to a door by pluralities of bolts and having an entrance groove where a striker of a vehicle body enters when the door is closed, wherein the door is supported on a side of the vehicle body so as to open and close in a transverse direction of a motor vehicle;

a latch rotatably supported on the base member by a first shaft to engage with the striker entering in the entrance groove;

a latch releasing member rotatably supported on the base member by a second shaft, wherein the latch releasing member keeps the door closed state by engaging with the latch meshing with the striker, and opens the door by rotating in a releasing direction to disengage from the latch; and a stopper rotatably supported on the base member by a third shaft to swing from a regular position to a lock position against a biasing force of a spring, wherein due to an action of an inertial force caused by an impact force which is received from a first direction corresponding to a direction in which the striker enters the entrance groove, a center of gravity of the stopper acts in an inward direction of the vehicle, and the stopper rotates from the regular position to the lock position against the biasing force of the spring in order to prevent the latch releasing member from rotating in the releasing direction, and wherein the latch releasing member has a center of gravity which is positioned to deviate from a rotation center of the latch releasing member so that another inertial force caused by another impact force which is received from a second direction opposite the first direction acts in an opposite direction to the releasing direction.

According to the present invention, it is possible to securely prevent a door from opening carelessly because a latch releasing member is not operated to release by an effect of an inertial force caused by an impact force by which a vehicle body or a door is affected.

BRIEF DESCRIPTION OF THE DRAWINGS

FIG. 15 provides tables explaining each shift of the components of the doors in the cases that impact forces affect the vehicle body.

EMBODIMENTS OF THE INVENTION

An embodiment according to the present invention is described with the drawings as follows.

Figure 1:
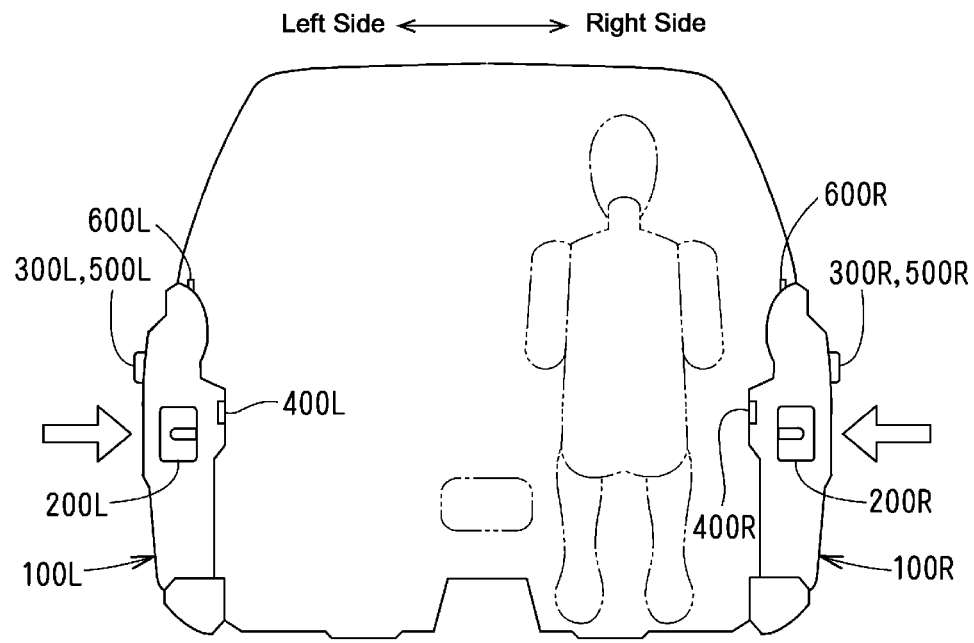
FIG. 1 is a schematic transverse sectional view showing a motor vehicle to which a door latch device of an embodiment of the present invention is applied.
Figure 2:
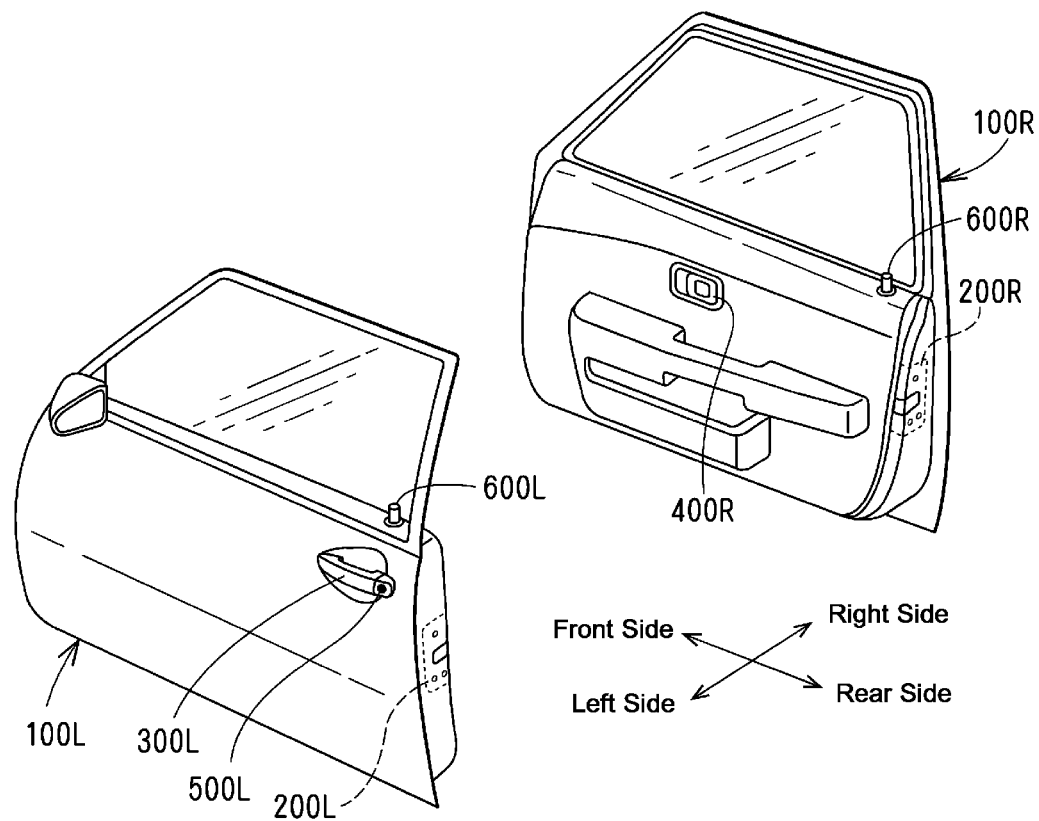
FIG. 2 is a perspective view of corresponding left and right doors of the vehicle, viewed from a diagonally backward left direction.

FIG. 1 is a schematic transverse sectional view showing a motor vehicle to which a door latch device of an embodiment of the present invention is applied. FIG. 2 is a perspective view of corresponding left and right doors of the motor vehicle, viewed from a diagonally backward left direction. A four-door type motor vehicle has left and right front doors 100L, 100R and left and right rear doors (not shown), wherein respective front end portions of these doors are rotatably supported on corresponding sides of a vehicle body by each door hinge (not shown) having a shaft in a vertical direction such that these doors are possible to be opened and closed in a transverse direction (crosswise direction) of the vehicle.

The front doors 100L, 100R are provided with the following respective left and right key components: door latch devices 200L, 200R; outside handles 300L, 300R; inside handles 400L, 400R; key cylinders 500L, 500R and locking knobs 600L, 600R. Although it is not shown, the rear doors are also provided with the above components except the key cylinders.

The left and right components including the doors are respectively arranged in left and right sides linearly symmetrical way. Thus, each component fixed to the right front door 100R is representatively explained regarding the formation below. The explanation regarding the right side components is alternatively interpreted regarding each component fixed to the left front door 100L such that "right" is replaced to "left" and vice versa. Since the respective door latch devices fixed to the rear doors have the substantially same basic configuration as those for the front doors, the explanation for them is omitted.

Figure 3:
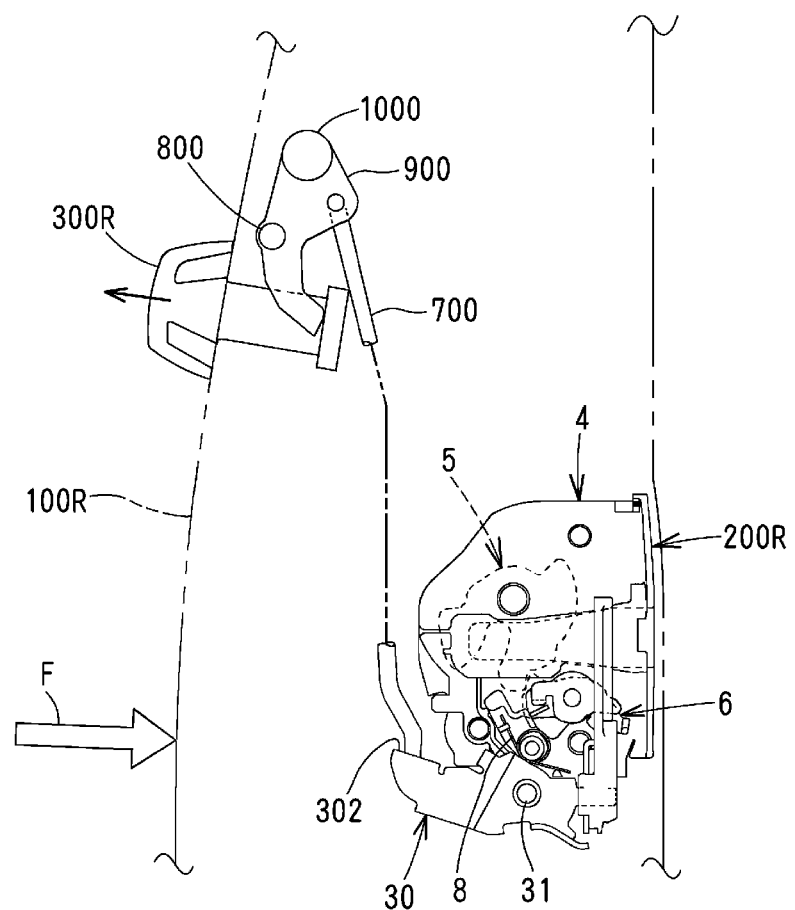
FIG. 3 is a front view showing a corresponding outside handle and the door latch device of the vehicle.

FIG. 3 is a front view showing the outside handle 300R and the door latch device 200R. The outside handle 300R is rotatably supported on a vehicle outside face (outer panel) of the front door (it is referred as "door" below) 100R by a shaft (not shown) in the vertical direction so as to swing, and connected to an outside lever 30 described below of the door latch device 200R via a handle lever 900 rotatably supported by a shaft 800 in a longitudinal direction of the vehicle and a mechanical connecting component 700 connected to this handle lever 900 such as a Bowden cable, a rod, etc. Therefore, when the handle lever 900 rotates around the shaft 800 in a clockwise direction at a predetermined angle in response to door opening operation of the outside handle 300R in an arrow direction (outside direction) shown in FIG. 3, this rotation is transmitted to the outside lever 30 via the connecting component 700 so that the door latch device 200R is operated to release as described below and then the door 100R can be released.

A formation relating to the outside handle 300R in this embodiment includes a counterweight 1000 fixed to an upper end portion of the handle lever 900. Therefore, when the door 100R receives an impact force F from the outside by a side crash accident and so on, the counterweight 1000 cancels an inertial force which affects the outside handle 300R in a door opening operation direction due to the impact force F, and thereby preventing the outside handle 300R from rotating in a door opening operation direction.

The inside handle 400R is rotatably supported on a vehicle inside face of the door 100R by a shaft in the vertical direction so as to swing, and connected to the door latch device 200R via a mechanical connecting component (not shown) such as a Bowden cable, a rod, etc. Therefore, the door latch device 200R can be operated to release the door 100R in response to door opening operation of the inside handle 400R in an inward direction of the vehicle (opposite direction to the opening direction of the door 100R).

A key cylinder 500R is rotatably supported on the vehicle outside face of the door 100R by a shaft in a transverse direction of the vehicle (crosswise direction), and operated to rotate from a neutral position to a left or right direction by a key plate inserted into it, and thereby selectively switching the door latch device 200R between an unlock state or a lock state.

A locking knob 600R is provided on a vehicle interior side of the door 100R and is able to selectively switch the door latch device 200R between the unlock state or lock state by a manual operation.

The unlock state is that in which the door latch device 200R can be operated to release the door 100R to open in response to the door opening operation of the outside handle 300 or the inside handle 400R. The lock state is that in which the door latch device 200R cannot be operated even if the outside handle 300 or the inside handle 400R is operated to open the door, and the door 100R cannot be opened.

Figure 4:
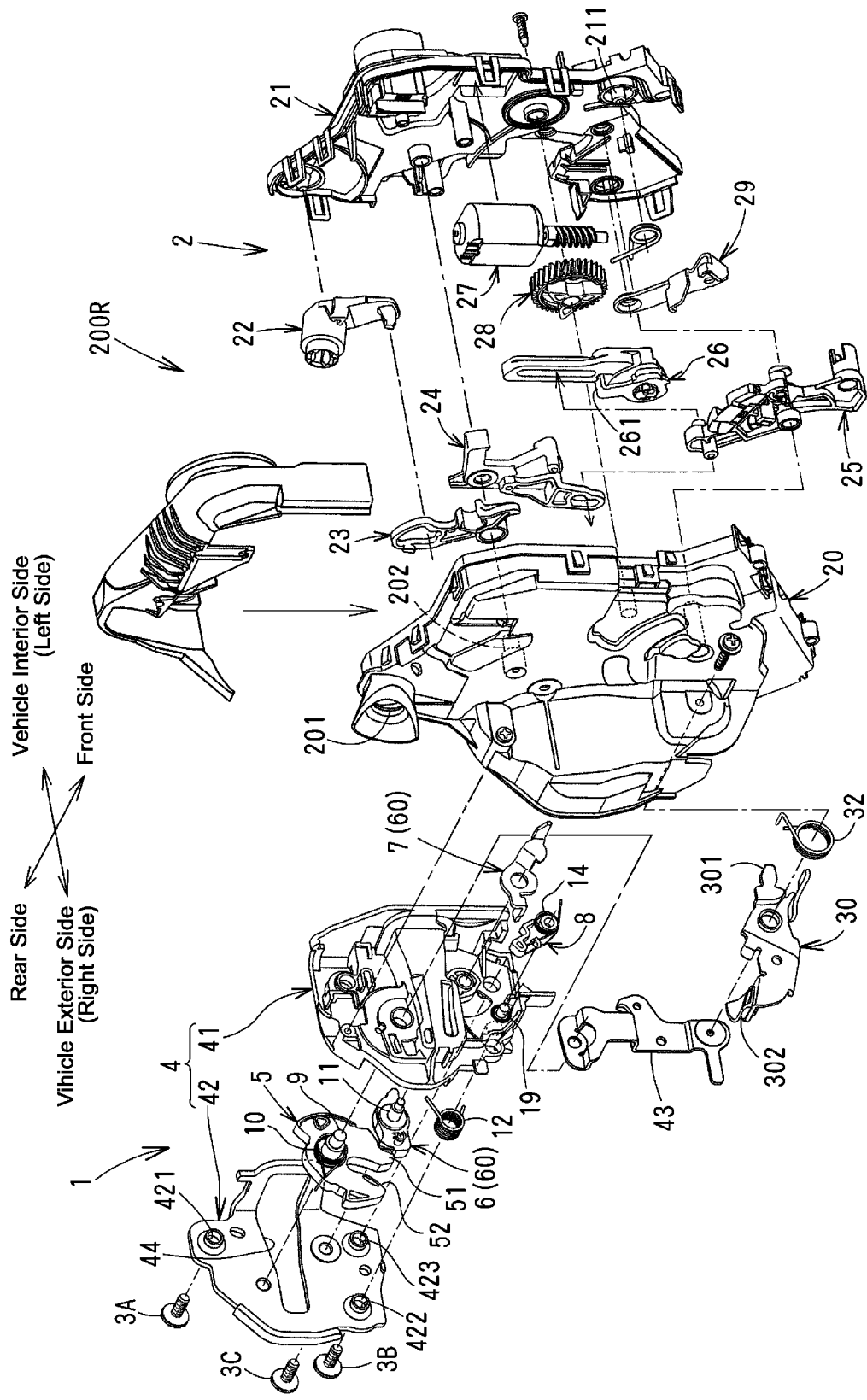
FIG. 4 is an exploded perspective view showing the door latch device.
Figure 5:
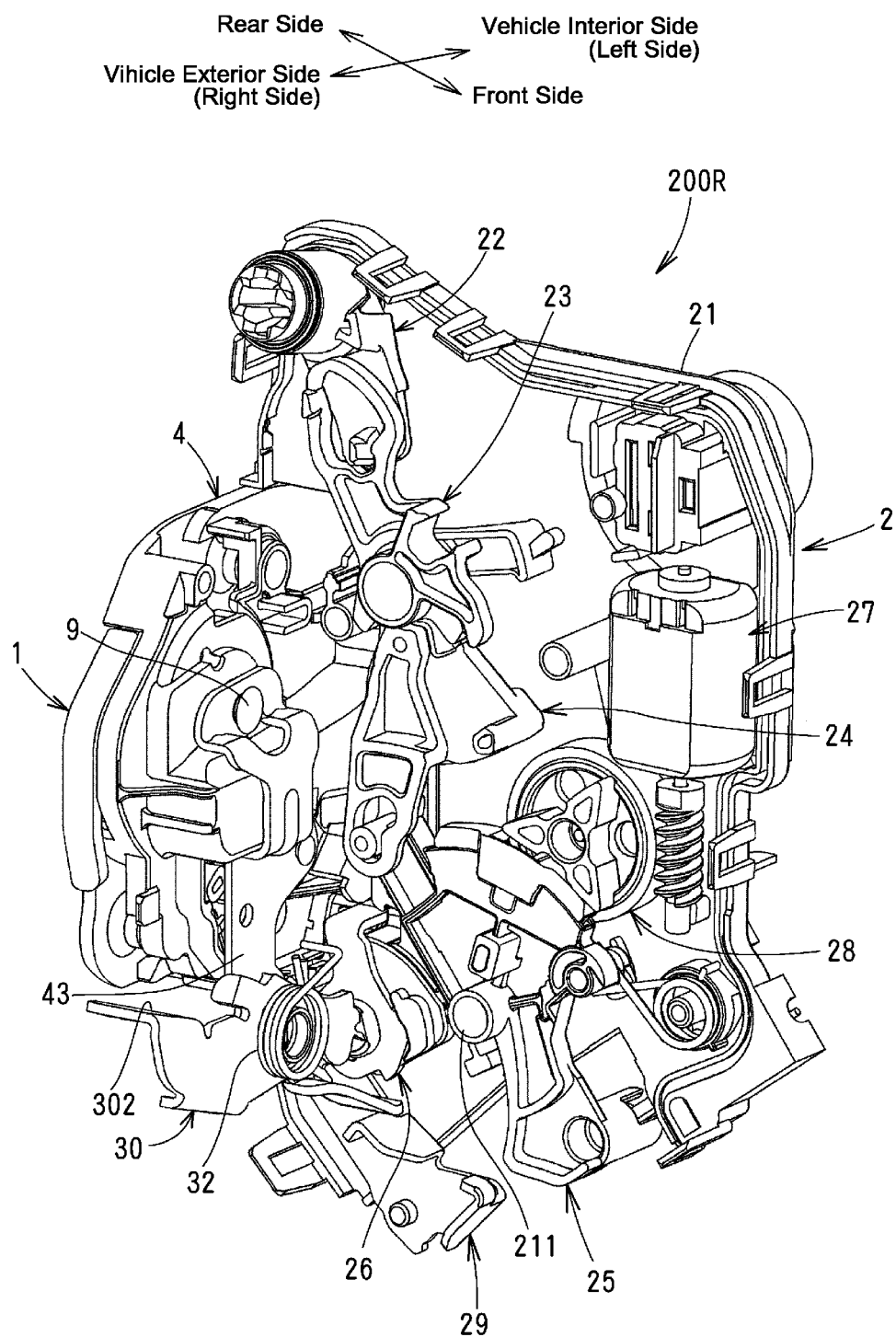
FIG. 5 is a perspective view showing the door latch device.
Figure 6:
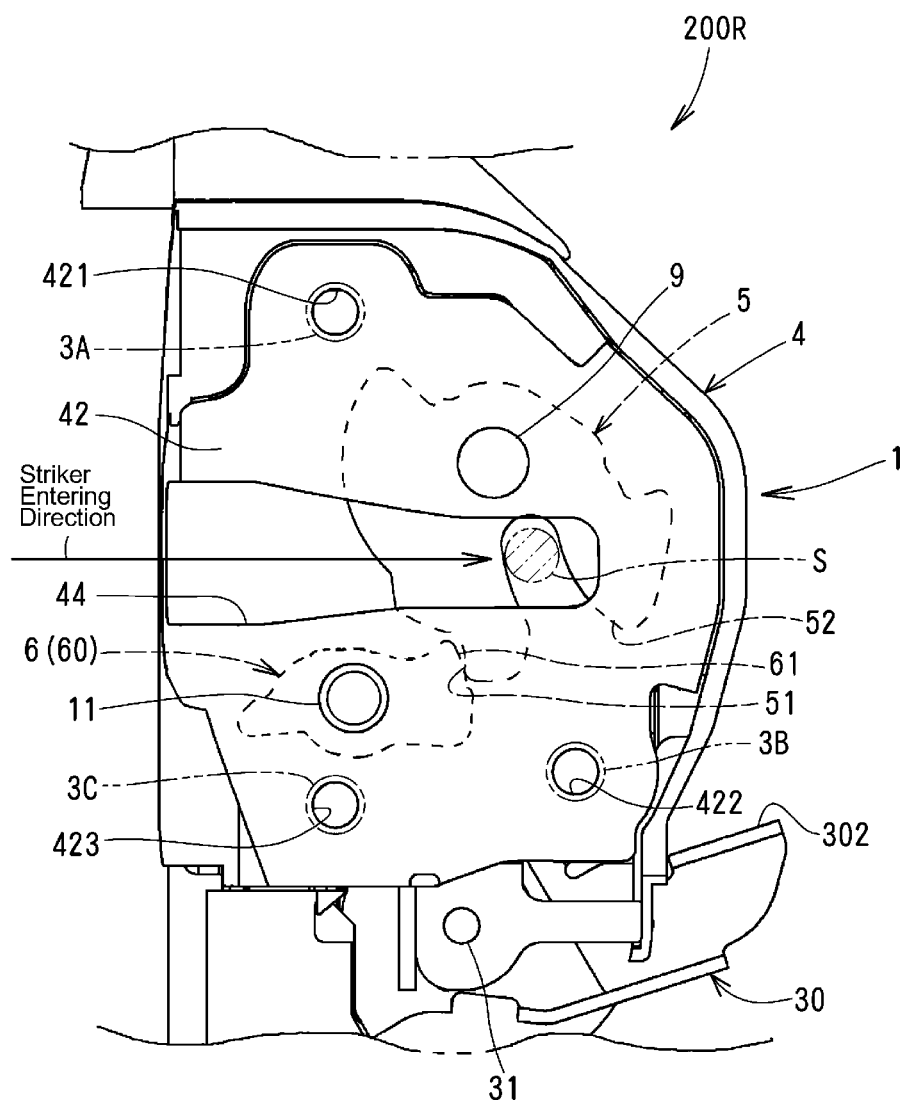
FIG. 6 is a back view showing the door latch device.
Figure 7:
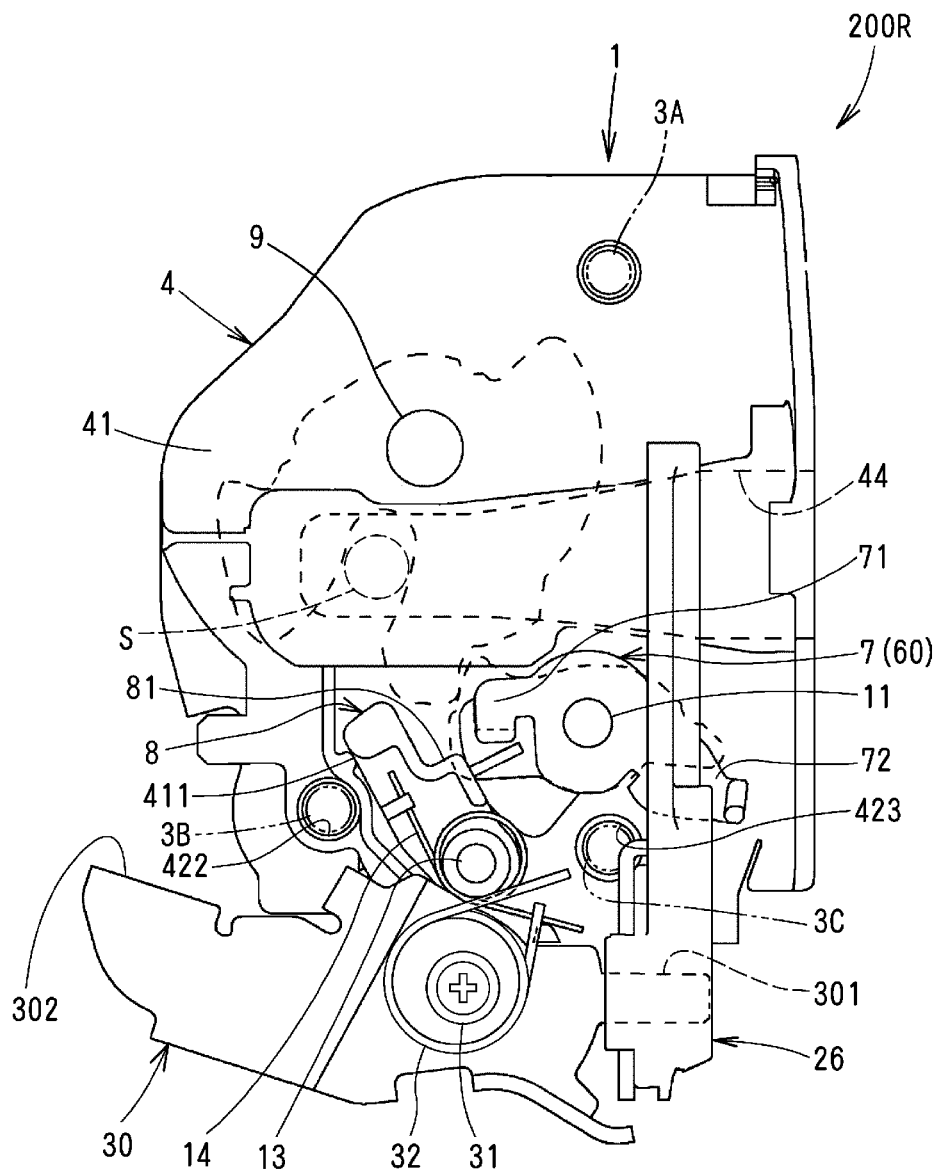
FIG. 7 is a front view showing the door latch device.
Figure 8:
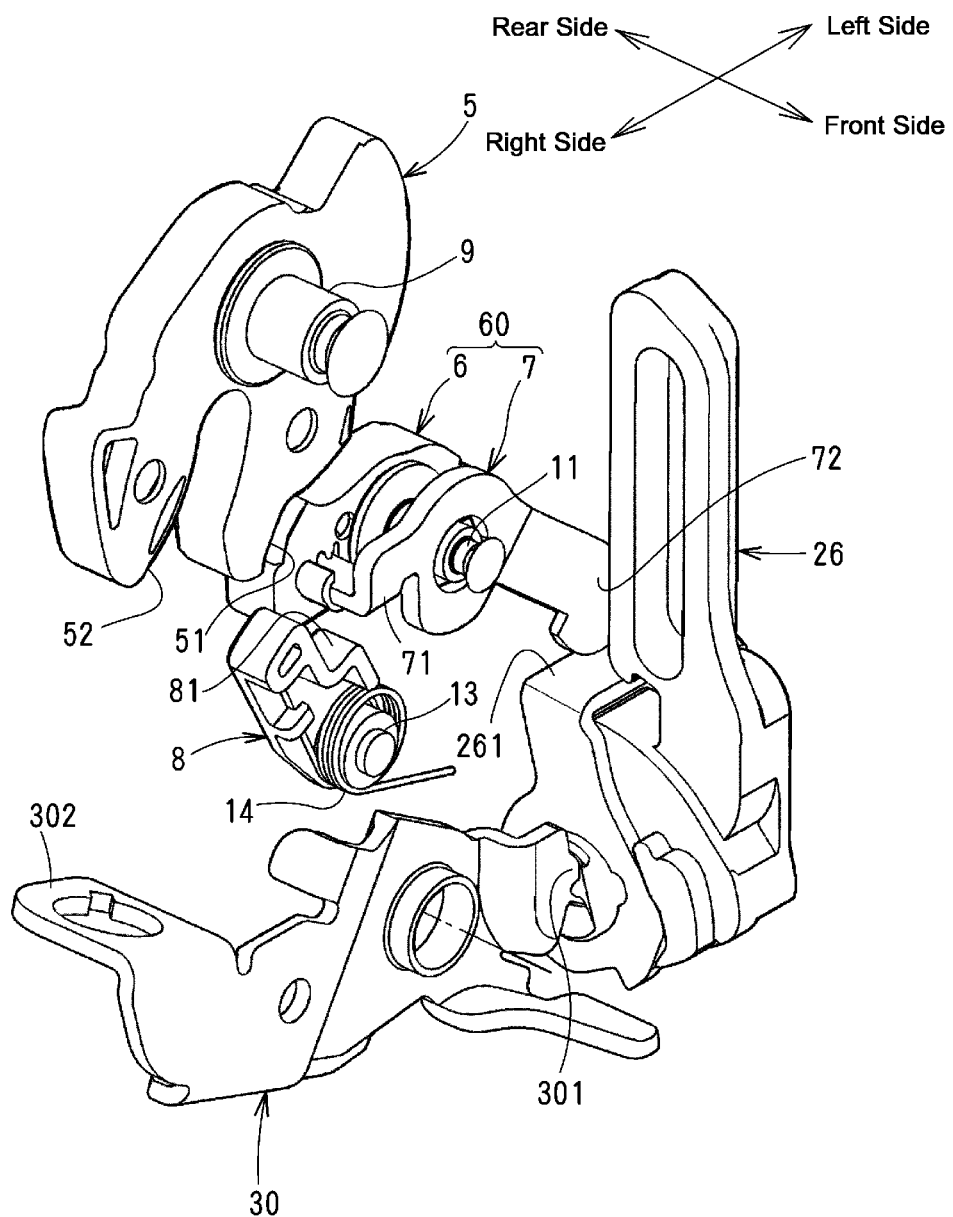
FIG. 8 is a perspective view showing a principal part of the door latch device.
Figure 9:
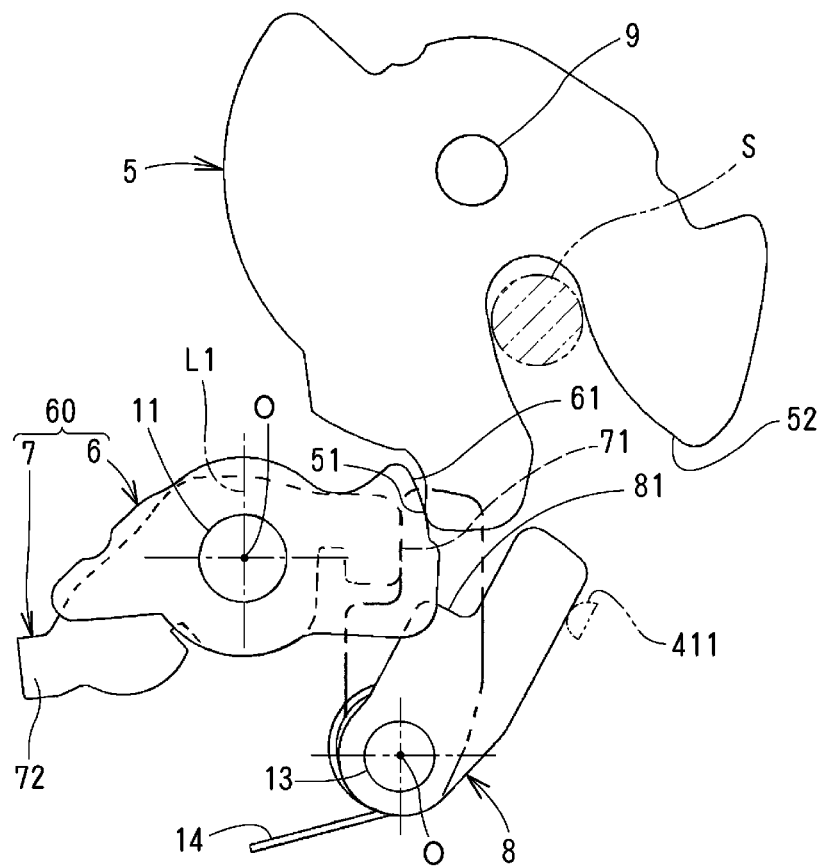
FIG. 9 is an enlarged back view showing key components of a corresponding engagement unit of the door latch device.

FIG. 4 is an exploded perspective view showing the door latch device 200R. FIG. 5 is a perspective view showing the door latch device 200R. FIG. 6 is a back view showing the door latch device 200R. FIG. 7 is a front view showing the door latch device 200R. FIG. 8 is a perspective view showing a principal part of the door latch device 200R. FIG. 9 is a back view showing a principal part of a corresponding engagement unit of the door latch device. FIG. 5 shows a state that a first cover 20 described below is taken off in order to clearly indicate an internal structure of the door latch device.

The door latch device 200R fixed to a rear end of the door 100R has an engagement unit 1 for holding the door 100R in a closed state and an operation unit 2 assembled to the engagement unit 1.

The engagement unit 1 comprises a base member 4 which is fixed to an inside of the rear end of the door 100R by fastening with pluralities of bolts 3A, 3B, 3C (three pieces in this example) directed forward. The base member 4 is provided with a striker entrance groove 44 in a crosswise direction, wherein a striker S fixed to the vehicle body can enter the striker entrance groove 44. As shown in FIG. 6, a latch 5 which can mesh with the striker S entering in the striker entrance groove 44 and a ratchet 6 which can engage with the latch 5 are rotatably housed in the base member 4. As shown in FIG. 7, an opening lever 7 which is rotatable integrally with the ratchet 6 and a stopper 8 which is rotatable at a predetermined angle when an inertial force more than a predetermined set value acts are mounted on a front face of the base member 4.

As shown in FIG. 4, the base member 4 is composed to include a body 41 made of synthetic resin and a cover member 42 made of metal fixed to the body 41 to close an opening facing rearward of the body 41. Moreover, a back member 43 made of metal is fixed to a front face of the body 41. The striker entrance groove 44 described above is formed in the body 41 and the cover member 42 respectively. The cover member 42 is provided with fastening holes 421, 422, 423 functioning as fixing parts into which the bolts 3A, 3B, 3C can screw respectively.

As shown in FIG. 6, the fastening hole 421 to which the bolt 3A screws is arranged upper than the striker entrance groove 44, the fastening hole 422 to which the bolt 3B screws is arranged lower than the striker entrance groove 44 and on the vehicle exterior side of the cover member, and the fastening hole 423 to which the bolt 3C screws is arranged lower than the striker entrance groove 44 and on the vehicle interior side of the cover member.

The latch 5 is rotatably supported between the body 41 and the cover member 42 by a latch shaft 9 in a longitudinal direction of the vehicle (a direction perpendicular to a transverse direction (crosswise direction)). When the door 100R is open, the latch 5 is held by biasing force of a spring 10 wound on the latch shaft 9 at an opening position (a position rotated by about 90 degrees in a clockwise direction from the position shown in FIG. 6) where the latch 5 does not mesh with the striker S. When the door 100R is closed, the latch 5 rotates in a meshing direction (counterclockwise direction in FIG. 6) from the opening position against the biasing force of the spring 10 by meshing with the striker S entering into the striker entrance groove 44 from an arrow direction shown in FIG. 6, passes a half-latch position where the latch 5 slightly meshes with the striker S such that the door 100R is in a half-closed state, and moves to a full-latch position (the position shown in FIG. 6) where the latch 5 completely meshes with the striker S such that the door 100R is in a fully closed state. When the door 100R is operated to open, the latch 5 rotates in a reverse direction to that in the closing operation.

The ratchet 6 is provided between the body 41 and the cover member 42 to be rotatably supported at a position lower than the striker entrance groove 44 by a ratchet shaft 11 in the longitudinal direction of the vehicle, and biased in an engaging direction (counterclockwise direction shown in FIG. 6) by a spring 12 supported in the base member 4. The ratchet 6 holds the door 100R in the fully closed state by engaging a claw part 61 formed on a vehicle exterior side edge of the ratchet 6 with a full-latch engaging part 51 of the latch 5, and holds the door 100R in the half-closed state by engaging with a half-latch engaging part 52. The claw part 61 of the ratchet 6 rotates in a releasing direction (clockwise direction shown in FIG. 6) from the engagement position at where engaging with the full-latch engaging part 51 or the half-latch engaging part 52 against the biasing force of the spring 12 to move downward. Thus, the ratchet 6 disengages from the full-latch engaging part 51 or the half-latch engaging part 52, and enables the door 100R to release.

As shown in FIG. 7, the opening lever 7 is provided at the front face side (front side of the drawing in FIG. 7) of the body 41, and rotatably supported by the same shaft as the ratchet 6 to rotate with the ratchet 6. The opening lever 7 rotates the ratchet 6 in the releasing direction by rotating in the releasing direction (counterclockwise direction in FIG. 7). The opening lever 7 is provided with a first arm part 71 extended toward the vehicle exterior side and a second arm part 72 extended toward the vehicle interior side in an obliquely downward direction.

Although the ratchet 6 and the opening lever 7 are formed separately in this embodiment, it is defined that they are formed as a substantially integral structure because the ratchet 6 and the opening lever 7 are members which always integrally rotate. Thus, in the present invention, a member including both functions of the ratchet 6 and the opening lever 7 is defined as a latch releasing member 60. Rightfully, needless to say, the ratchet 6 and the opening lever 7 can be formed in an integral structure.

The stopper 8 is provided between the front face of the body 41 and the back member 43. As shown in FIG. 7, a lower end portion of the stopper 8 is rotatably supported at a portion lower than the striker entrance groove 44 by a shaft 13 which is in the longitudinal direction of the vehicle and is positioned at the vehicle exterior side than the ratchet shaft 11 such that the stopper 8 is rotatable in the transverse direction of the vehicle (crosswise direction) at a predetermined angle. The stopper 8 is also biased in the counterclockwise direction in FIG. 7 by a spring 14 wound on the shaft 13. In a regular condition where an inertial force does not act, the stopper 8 comes into contact with a stopping part 411 formed on the body 41 to be held at a regular position shown by a solid line in FIGS. 7, 9. When an inertial force more than a predetermined set value acts, the stopper 8 moves to a lock position shown by a two-dot chain line in FIG. 9 against the biasing force of the spring 14. The back member 43 is omitted in FIG. 7.

When the stopper 8 is in the regular position, an upward blocking part 81 formed in a stepped shape on a left side edge of the stopper 8 is in a state of getting out from a moving locus of the first arm part 71 of the opening lever 7, and does not block the rotation of the latch releasing member 60 in the releasing direction from the engagement position. However, when the stopper 8 is affected so as to rotate to the lock position by the inertial force, the blocking part 81 moves to a position under the first arm part 71 of the opening lever 7, namely, enters in the moving locus to come into contact with a lower part of the first arm part 71, and blocks the rotation (release operation) of the latch releasing member 60 in the releasing direction from the engagement position. Therefore, the door 100R is prevented from releasing.

As shown in FIG. 7, the stopper 8 is arranged to operate at a portion which is lower than the striker entrance groove 44, is upper than the outside lever 30 described below, and is between the fastening hole 422 on the vehicle exterior side and the fastening hole 423 on the vehicle interior side. Thus, the stopper 8 can be arranged in a limited space of the base member 4, thereby preventing the engagement unit 1 from increasing in size.

Figure 10:
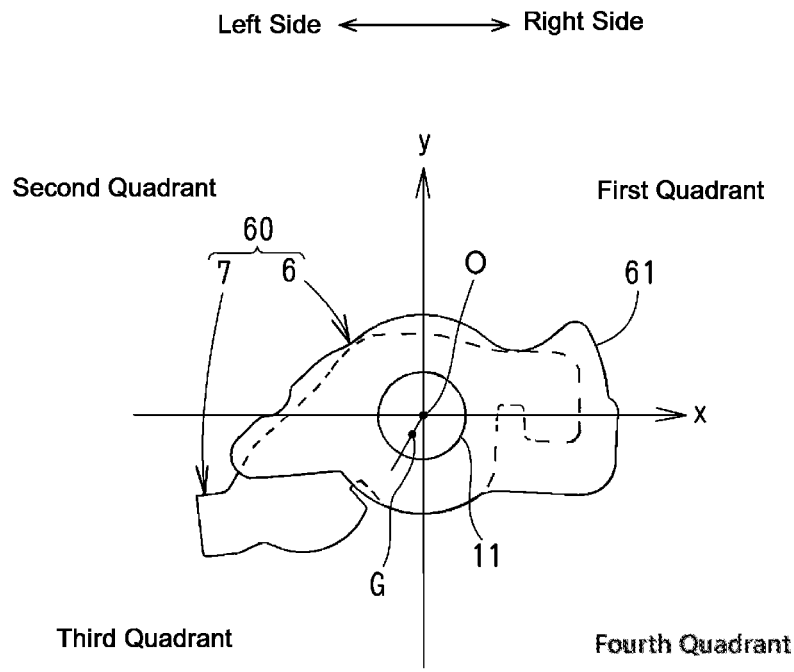
FIG. 10 is a back view showing corresponding latch releasing members of the door latch device.
Figure 11:
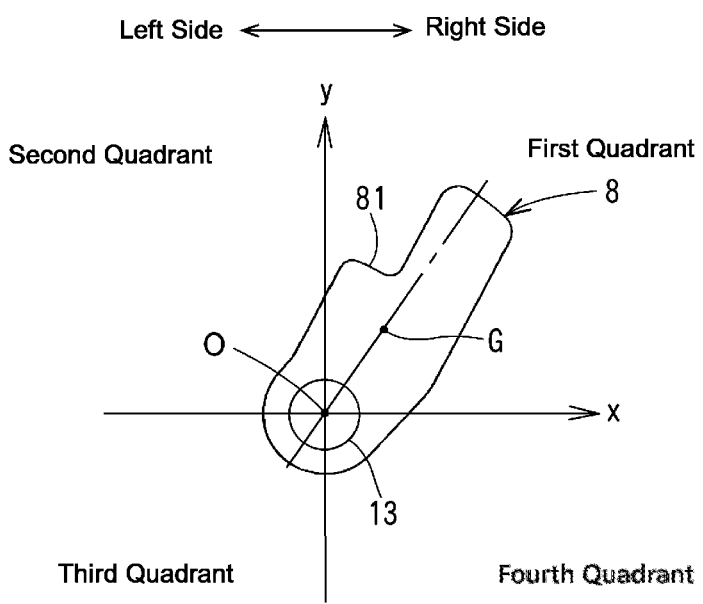
FIG. 11 is a back view showing a corresponding stopper of the door latch device.

FIG. 10 is a back view showing the latch releasing member 60, and FIG. 11 is a back view showing the stopper 8.

As shown in FIG. 10, when the latch releasing member 60 of the right door latch device 200R is viewed from a rear side, it is provided that a rotation center O of the latch releasing member 60 (it is equivalent to an axis of the ratchet shaft 11) is fixed as an origin point, that a straight line passing this origin point O and extending in a crosswise direction is fixed as an x-axis, that a straight line which passes this origin point O on a vertical plane and is perpendicular to the x-axis is fixed as a y-axis, that a direction to the vehicle exterior side (right side) in the x-axis is fixed as a positive direction, that an upward direction in the y-axis is fixed as a positive direction, and that a first quadrant to a fourth quadrant are fixed by the x-axis and the y-axis. In this case, when the latch releasing member 60 is at the engagement position (the state that the claw part 61 of the ratchet 6 engages with the full-latch engaging part 51 or the half-latch engaging part 52 of the latch 5), it is configured such that the claw part 61 is positioned in the first quadrant and the center of gravity G is positioned in the third quadrant.

Although an illustration is omitted, since the latch releasing member 60 of the left door latch device 200L and the right latch releasing member 60 are arranged in line symmetry, when the left latch releasing member 60 is in the engagement position, it is configured such that its claw part 61 is positioned in the second quadrant and its center of gravity G is positioned in the fourth quadrant.

As shown in FIG. 11, when the stopper 8 of the right door latch device 200R is viewed from a rear side, it is provided that a rotation center O of the stopper 8 (it is equivalent to an axis of the shaft 13) is fixed as an origin point, that a straight line passing this origin point O and extending in a crosswise direction is fixed as an x-axis, that a straight line which passes this origin point O on a vertical plane and is perpendicular to the x-axis is fixed as a y-axis, that a direction to the vehicle exterior side (right side) in the x-axis is fixed as a positive direction, that an upward direction in the y-axis is fixed as a positive direction, and that a first quadrant to a fourth quadrant are fixed by the x-axis and the y-axis. In this case, when the stopper 8 is in the regular position, it is configured such that the blocking part 81 and the center of gravity G are positioned in the first quadrant which is in the symmetrical position with respect to the origin point with the third quadrant in where the center of gravity G of the latch releasing member 60 is positioned.

Although an illustration is omitted, since the stopper 8 of the left door latch device 200L and the right stopper 8 are arranged in line symmetry, when the left stopper 8 is at the regular position, it is configured such that its blocking part 81 and its center of gravity G is positioned in the second quadrant.

The operation unit 2 of the door latch device 200R is explained below.

As shown in FIGS. 4, 5, the operation unit 2 has a cover (no reference sign) which comprises a first cover 20 (omitted in FIG. 5) made of synthetic resin fixed to the base member 4 to spread over a front side of the base member 4 and a second cover 21 made of synthetic resin closing a side face of the first cover 20 facing to the vehicle interior side, and an operation mechanism (no reference sign) housed in the cover.

Main components of the operation mechanism are a first and a second key levers 22, 23 interlocked with an operation of the key cylinder 500R provided on the door 100R, a connecting lever 24 connected to the second key lever 23, a locking lever 25 connected to the connecting lever 24 and rotatable between an unlock position and a lock position, a lifting lever 26 movable between an unlock position and a lock position together with the locking lever 25, a motor 27, a worm wheel 28 rotating the locking lever 25 between the unlock position and the lock position by a rotation of the motor 27, an inside lever 29 connected to the inside handle 400R provided on the door 100R, and an outside lever 30 connected to the outside handle 300R provided on the door 100R. Since the other components are not directly related to the present invention, they are only shown in the drawings without explanation.

The locking lever 25 and lifting lever 26 compose a locking/unlocking mechanism which makes the door latch device 200R switch between the unlock state and the lock state. The unlock positions of the locking lever 25 and lifting lever 26 are those where the locking/unlocking mechanism is in the unlock state, and similarly the lock positions of them are those where the locking/unlocking mechanism is in the lock state.

The first key lever 22 is rotatably supported by a bearing hole 201 provided in the vehicle inside-outside direction on an upper portion of the first cover 20, and operated to rotate from a neutral position to an unlocking direction or a locking direction opposite the unlocking direction by the key cylinder 500R. The second key lever 23 is rotatably supported between the first and second covers 20, 21 by a shaft 202 provided in the vehicle inside-outside direction on the first cover 20. An upper portion of the second key lever 23 is connected to a lower portion of the first key lever 22, and thus the second key lever 23 is interlocked to rotate from a neutral position to an unlocking direction or a locking direction with rotation of the first key lever 22. The connecting lever 24 is rotatably supported by the same shaft as the second key lever 23. The connecting lever 24 transmits the rotation of the second key lever 23 according to the operation of the key cylinder 500R to the locking lever 25. The locking lever 25 is rotatably supported between the first and second covers 20, 21 by a shaft 211 in the longitudinal direction of the vehicle, and operated to rotate between the unlock position and the lock position in response to the rotation of the worm wheel 28 driven by the motor 27, the rotation of the connecting lever 24 or the operation of the locking knob 600R.

A lower portion of the lifting lever 26 is connected to a vehicle interior side end part 301 of the outside lever 30 to rotate in the longitudinal direction of the vehicle at a predetermined angle, and an upper portion of the lifting lever 26 is connected to the locking lever 25 to slide in the vertical direction. Thus, the lifting lever 26 is interlocked to rotate selectively to the unlock position or the lock position centered around the vehicle interior side end part 301 of the outside lever 30 with a movement of the locking lever 25, and released upward by rotation of the outside lever 30.

The outside lever 30 is rotatably supported on a lower portion of the back member 43 by a shaft 31 in the longitudinal direction of the vehicle. As shown in FIG. 3, since a connecting part 302 formed on a vehicle exterior side end portion of the outside lever 30 is connected to the handle lever 900 via the connecting component 700, the outside lever 30 rotates in the releasing direction (counterclockwise direction in FIG. 3) against a biasing force of the spring 32 wound on the shaft 31 in response to the door opening operation of the outside handle 300R, and releases the lifting lever 26 upward by the rotation.

An upper portion of the inside lever 29 is rotatably supported on an inside face of the second cover 21 by the shaft 211 in the crosswise direction, and a lower end portion of the inside lever 29 is connected to the inside handle 400R via a connecting member (not shown) of a mechanical element (not shown) such as a Bowden cable. Thus, the inside lever 29 releases the lifting lever 26 via the outside lever 30 in response to the door opening operation of the inside handle 400R.

According to the above described formation, in a case where the locking/unlocking mechanism (the locking lever 25, the lifting lever 26) is in the unlock state, when the lifting lever 26 is released upward in response to the door opening operation of the outside handle 300R or the inside handle 400R, a releasing part 261 formed on the lifting lever 26 comes into contact with a second arm part 72 of the opening lever 7 from downward, and thus the lifting lever 26 is able to rotate the latch releasing member 60 in the releasing direction. Therefore, in this state, the door 100R can be opened by the door opening operation of the outside handle 300R or the inside handle 400R.

In a case where the locking/unlocking mechanism is in the lock state, even if the lifting lever 26 is operated to release in response to the door opening operation of the outside handle 300R or the inside handle 400R, the releasing part 261 does not come into contact with the second arm part 72 of the opening lever 7, and the lifting lever 26 cannot rotate the latch releasing member 60 in the releasing direction. Therefore, in this state, the door 100R cannot be opened even if the outside handle 300R or the inside handle 400R is operated to open the door.

An action when an impact force affects the vehicle body by an accident and so on is explained with referring to FIGS. 12-15.

Figure 12:
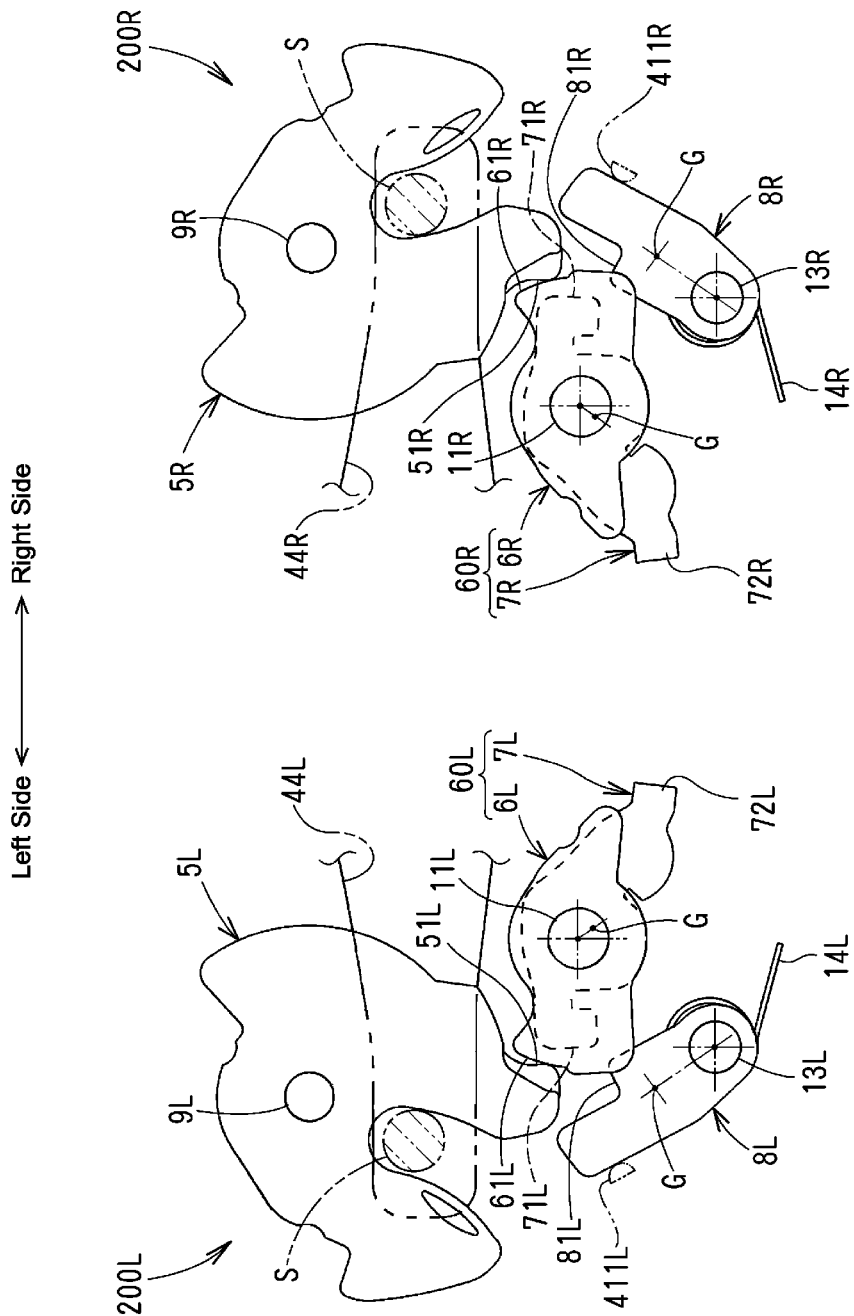
FIG. 12 is a back view showing key components of each of the left and right door latch devices in a normal state.
Figure 13:
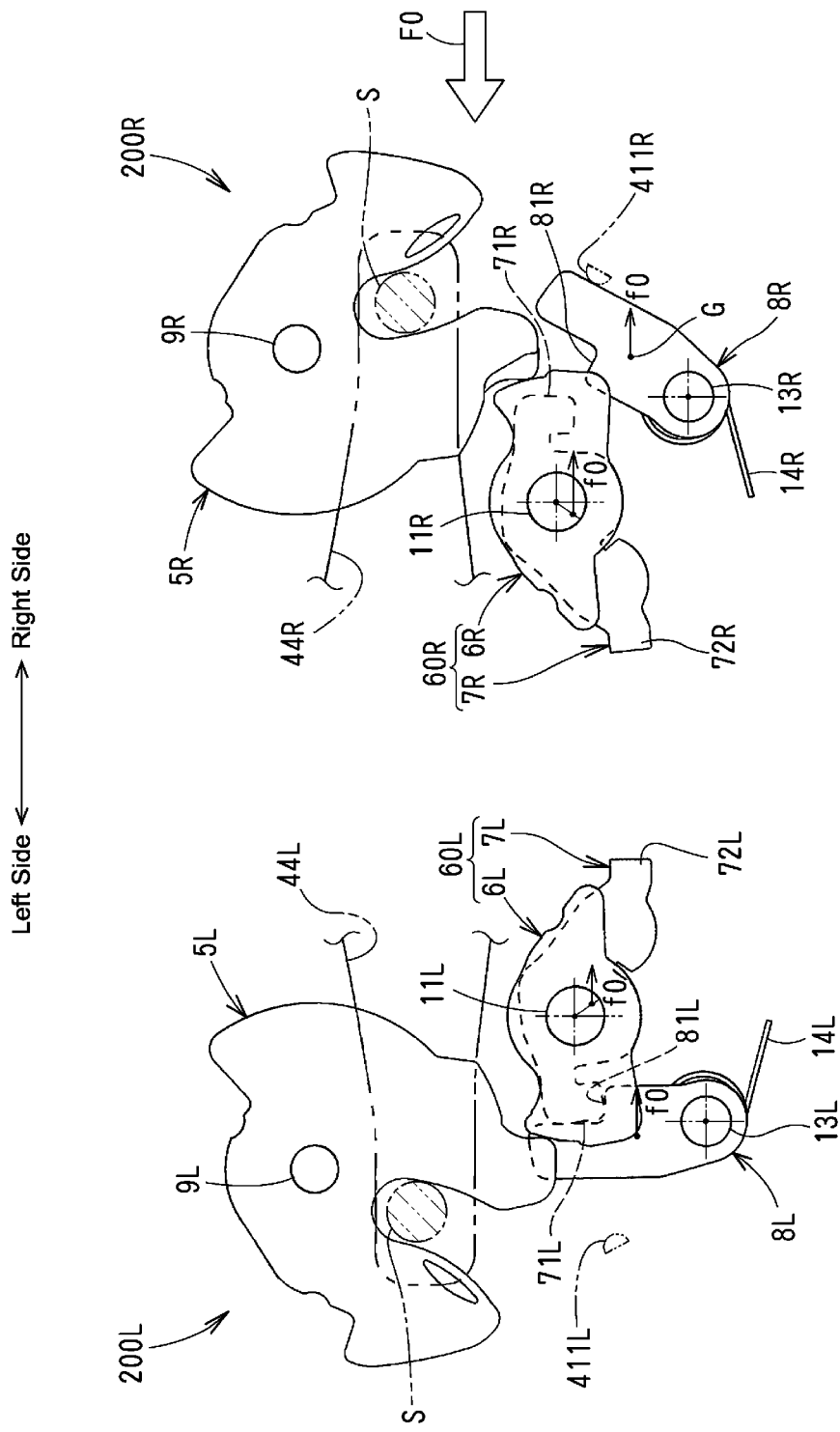
FIG. 13 is a back view showing key components of each of the left and right door latch devices when a right side face of a vehicle body receives an impact.
Figure 14:
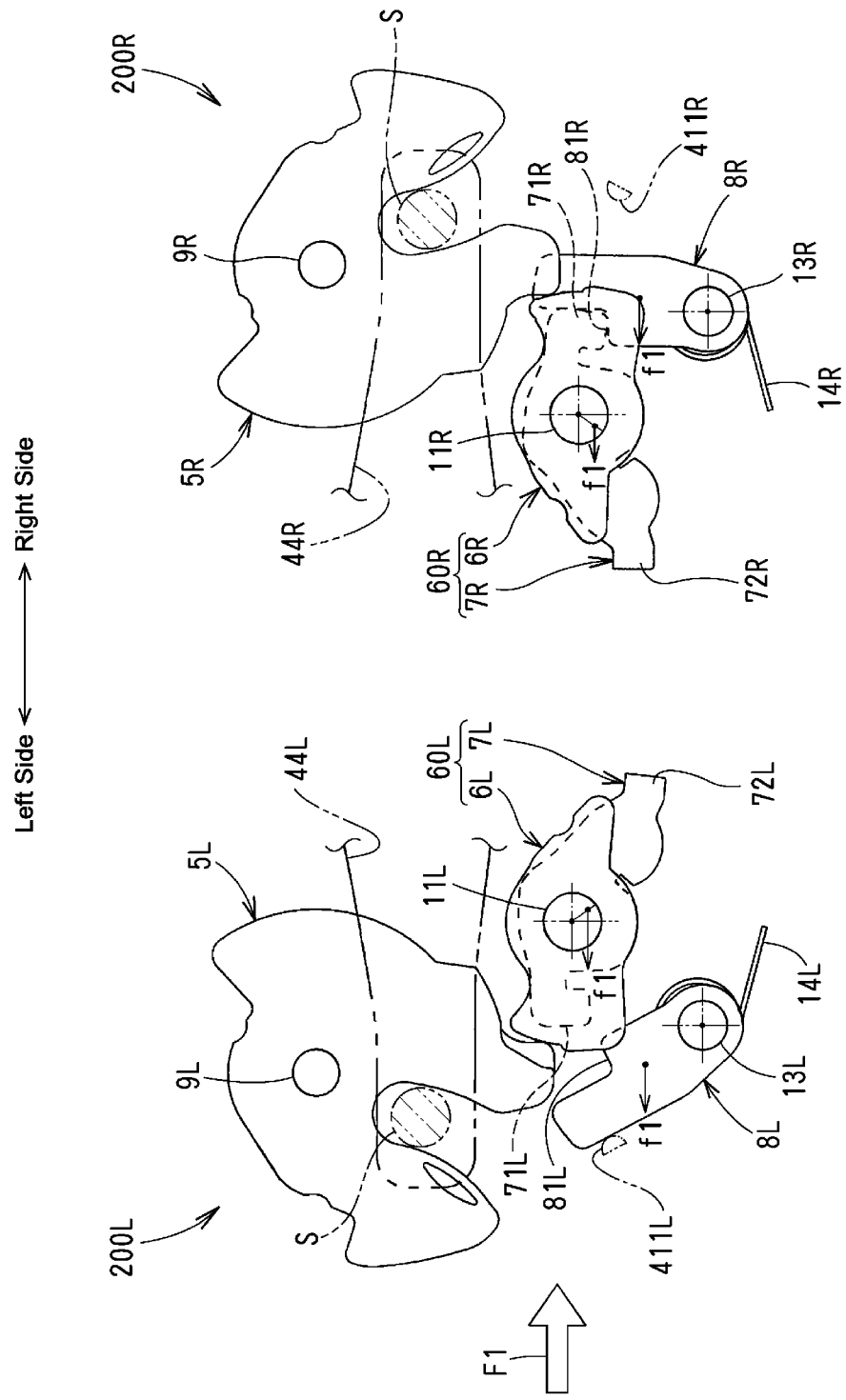
FIG. 14 is a back view showing the key components of each of the left and right door latch devices when a left side face of the vehicle body receives another impact.

FIGS. 12-14 are back views respectively showing key components of each of the left and right door latch devices 200L, 200R. In FIGS. 12-14, the door latch device 200L fixed to the door 100L is shown on the left side, and the door latch device 200R fixed to the door 100R is shown on the right side. FIG. 15 provides tables explaining each shift of the components of the left door 100L and each shift of the components of the right door 100R in the cases that impact forces affect the vehicle body.

Regarding each reference sign of the components shown in FIGS. 12-14, in order to distinguish between the components of the left door latch device 200L and those of the right door latch device 200R, the letter "L" is attached to the end of each reference sign of the components of the door latch device 200L, and the letter "R" is attached to the end of each reference sign of the components of the door latch device 200 R.

<Normal State Wherein Doors 100L, 100R are Closed>

As shown in FIG. 12, in a normal state, the left and right strikers S mesh with the latches 5L, 5R respectively, and the claw parts 61L, 61R of the ratchets 6L, 6R engage with the full-latch engaging parts 51L, 51R of the latches 5L, 5R respectively. The stoppers 8L, 8R are held at respective regular positions by each biasing force of the springs 14L, 14R. Therefore, in the case where the locking/unlocking mechanism is in the unlock state in this condition, the doors 100L, 100R can be opened by rotating the latch releasing members 60L, 60R in the releasing direction in response to the door opening operation of the outside handles 300L, 300R or the inside handles 400L, 400R. In the case where the locking/unlocking mechanism is in the lock state, the relation between the opening lever 7 and the lifting lever 26 is disconnected. Thus, each of the door opening operations of the outside handles 300L, 300R and the inside handles 400L, 400R is not transmitted to the latch releasing members 60L, 60R, and then the doors 100L, 100R cannot be opened.

<In a Case that Door 100R or Right Side Face of Vehicle Body Having Door 100R is Affected by Impact Force F0 from Outside by Side Crash Accident and so on>

It is explained with referring to FIG. 13 and FIG. 15 (a) below. On the door 100R side on which an impact force F0 acts directly, although the outside handle 300R is affected by an inertial force in the door opening operation direction, the outside handle 300R is not displaced in the door opening operation direction because the handle lever 900 is provided with the counterweight 1000 for cancelling the inertial force as described above. Since the inside handle 400R is affected by an inertial force in the opposite direction to the door opening operation direction, the inside handle 400R is not displaced in the door opening operation direction. Therefore, whether the locking/unlocking mechanism is in the unlock state or lock state, it is avoided that the displacement of the outside handle 300R or the inside handle 400R in the door opening operation direction is transmitted to the latch releasing member 60R.

As understandable from FIG. 13, the direction of the impact force F0 corresponds to a first direction to which the striker S is directed to enter the entrance groove 44L in the left door latch device 200L, and corresponds to a second direction opposite the first direction in the right door latch device 200R.

As shown in FIG. 13, in the door latch device 200R, when the impact force F0 affects the right side face of the vehicle body from an external right side (vehicle outside), an inertial force f0 caused by the impact force F0 affects the center of gravity G of the latch releasing member 60R and that of the stopper 8R in the direction opposite the impact force F0 (right direction in FIG. 13).

Thus, although the stopper 8R is affected by the inertial force f0 in the direction (clockwise direction in FIG. 13) opposite the locking direction, the stopper 8R is blocked from rotating in the opposite direction by the stopping part 411R and not displaced from the regular position. On the other hand, since the latch releasing member 60R is affected by the inertial force f0 in the direction opposite the latch releasing direction, namely, the engaging direction (counterclockwise direction in FIG. 13), the latch releasing member 60R is held at the engagement position. Therefore, even if the stopper 8R is at the regular position, the engagement state between the ratchet 6R and the latch 5R is held, and it is avoided that the release operation is caused by the inertial force 10.

On the door 100L side (left side) opposite the side affected by the impact, since the outside handle 300L is affected by an inertial force in the direction opposite the door opening operation direction, it is avoided that the outside handle 300L is displaced in the door opening operation direction. The inside handle 400L is affected by an inertial force in the door opening operation direction. Therefore, in a case where the locking/unlocking mechanism is in the unlock state, when the inside handle 400L is displaced by the inertial force in the door opening operation direction, there is a risk that this displacement is transmitted to the latch releasing member 60L of the door latch device 200L. However, in a case where the locking/unlocking mechanism is in the lock state, the relation between the opening lever 7 and the lifting lever 26 is disconnected, and the displacement of the inside handle 400L in the door opening operation direction is not transmitted.

The latch releasing member 60L of the door latch device 200L is affected by the inertial force 10 in the latch releasing direction (counterclockwise direction). Thus, even if the locking/unlocking mechanism is in the lock state, there is a risk that the latch releasing member 60L is displaced in the latch releasing direction.

However, since the stopper 8L is affected by the inertial force f0 in the locking direction (clockwise direction in FIG. 13), the stopper 8L is displaced from the regular position to the lock position against the biasing force of the spring 14L. Then, the blocking part 81L enters the moving locus of the first arm part 71L of the opening lever 7L of the latch releasing member 60L, blocks the rotation of the latch releasing member 60L in the releasing direction, and holds the engagement state between the ratchet 6L and the latch 5L. Therefore, the door 100L is prevented from releasing.

As described above, when the right side face of the vehicle body is affected by the impact force F0 from the outside, on the right door 100R, although the stopper 8R is not displaced to the lock position, the latch releasing member 60R is affected by the inertial force f0 in the engaging direction, and held at the engagement position to prevent the door 100L from releasing. On the left door 100L side opposite the side affected by the impact force F0, the stopper 8L is displaced from the regular position to the lock position by the inertial force f0 caused by the impact force F0 to block the release operation wherein the latch releasing member 60L is displaced in the releasing direction. Therefore, the door 100L is prevented from opening.

<In a Case that Door 100L or Left Side Face of Vehicle Body Having Door 100L is Affected by Impact Force F1 from Outside by Side Crash Accident and so on>

It is explained with referring to FIG. 14 and FIG. 15 (b) below. On the door 100L side on which the impact force F0 acts directly, although the outside handle 300L, is affected by an inertial force in the door opening operation direction, the outside handle 300L is not displaced in the door opening operation direction because the handle lever 900 is provided with the counterweight 1000 for cancelling the inertial force as described above. Since the inside handle 400L is affected by an inertial force in the opposite direction to the door opening operation direction, the inside handle 400L is not displaced in the door opening operation direction. Therefore, whether the locking/unlocking mechanism is in the unlock state or lock state, it is avoided that the displacement of the outside handle 300L, or the inside handle 400L in the door opening operation direction is transmitted to the latch releasing member 60L.

As understandable from FIG. 14, the direction of the impact force F1 corresponds to a first direction to which the striker S is directed to enter the entrance groove 44R in the right door latch device 200R, and corresponds to a second direction opposite the first direction in the left door latch device 200L.

As shown in FIG. 14, in the door latch device 200L, when the impact force F1 affects the left side face of the vehicle body from an external left side (vehicle outside), an inertial force f1 caused by the impact force F1 affects the center of gravity G of the latch releasing member 60L and that of the stopper 8L in the direction opposite the impact force F1 (left direction in FIG. 14).

Thus, although the stopper 8L is affected by the inertial force 11 in the direction (counterclockwise direction in FIG. 14) opposite the locking direction, the stopper 8L, is blocked from rotating in the opposite direction by the stopping part 411L and not displaced from the regular position. On the other hand, since the latch releasing member 60L is affected by the inertial force f1 in the direction opposite the latch releasing direction, namely, the engaging direction (clockwise direction in FIG. 14), the latch releasing member 60L is held at the engagement position. Therefore, even if the stopper 8L is at the regular position, the engagement state between the ratchet 6L and the latch 5L is held, and it is avoided that the release operation is caused by the inertial force f1.

On the door 100R side (right side) opposite the side affected by the impact, since the outside handle 300R is affected by an inertial force in the direction opposite the door opening operation direction, it is avoided that the outside handle 300R is displaced in the door opening operation direction. On the other hand, the inside handle 400R is affected by an inertial force in the door opening operation direction. Therefore, in a case where the locking/unlocking mechanism is in the unlock state, when the inside handle 400R is displaced by the inertial force in the door opening operation direction, there is a risk that this displacement is transmitted to the latch releasing member 60R of the door latch device 200R. However, in a case where the locking/unlocking mechanism is in the lock state, the relation between the opening lever 7 and the lifting lever 26 is disconnected, and the displacement of the inside handle 400R in the door opening operation direction is not transmitted to the latch releasing member.

The latch releasing member 60R of the door latch device 200R is affected by the inertial force f1 in the latch releasing direction (clockwise direction). Thus, even if the locking/unlocking mechanism is in the lock state, there is a risk that the latch releasing member 60R is displaced in the latch releasing direction.

However, since the stopper 8R is affected by the inertial force f1 in the locking direction (counterclockwise direction in FIG. 14), the stopper 8R is displaced from the regular position to the lock position against the biasing force of the spring 14R. Then, the blocking part 81R enters the moving locus of the first arm part 71R of the opening lever 7R of the latch releasing member 60R, blocks the rotating of the latch releasing member 60R in the releasing direction, and holds the engagement state between the ratchet 6R and the latch 5R. Therefore, the door 100R is prevented from releasing.

As described above, when the left side face of the vehicle body is affected by the impact force F1 from the outside, on the left door 100L, although the stopper 8L, is not displaced to the lock position, the latch releasing member 60L is affected by the inertial force f1 in the engaging direction, and the latch releasing member 60L is held at the engagement position to prevent the door 100L from releasing. On the right door 100R side opposite the side affected by the impact force F1, the stopper 8R is displaced from the regular position to the lock position by the inertial force f1 caused by the impact force F1 to block the release operation wherein the latch releasing member 60R is displaced in the releasing direction. Therefore, the door 100R is prevented from opening.

(In a Case that Downward Inertial Force Acts Due to Sideslip Accident and so on)

It is explained with referring to FIG. 12 and FIG. 15 (c) below. A downward inertial force does not affect the outside handles 300L, 300R and the inside handles 400L, 400R in the door opening operation direction.

In the door latch devices 200L, 200R, the center of gravity G of the stopper 8L is in the second quadrant, and the center of gravity G of the stopper 8R is in the first quadrant. When each of the centers of gravity G is affected by the downward inertial force, the stoppers 8L, 8R are affected by a moment of inertia in the direction opposite the locking direction, and not displaced from the respective regular positions. However, the center of gravity G of the latch releasing member 60L is in the fourth quadrant, and the center of gravity G of the latch releasing member 60R is in the third quadrant. Thus, when each of the center of gravity G is affected by the downward inertial force, the latch releasing members 60L, 60R are affected by a moment of inertia in the direction opposite the latch releasing direction, namely, the engaging direction, and the latch releasing member 60L, 60R are held at the respective engagement positions.

As described above, when the downward inertial force acts, although the stoppers 8L, 8R are not displaced to the respective lock positions, the latch releasing member 60L, 60R are affected by the inertial force in the engaging direction and held at the respective engagement positions, and thereby preventing the doors 100L, 100R from releasing.

(In a Case that Upward Inertial Force Acts Due to Some Reason)

It is explained with referring to FIG. 12 and FIG. 15 (d) below. An upward inertial force does not affect the outside handles 300L, 300R and the inside handles 400L, 400R in the door opening operation direction.

When the door latch devices 200L, 200R are affected by the upward inertial force, there is a risk that the latch releasing members 60L, 60R are displaced in the releasing direction by a moment of inertia in the latch releasing direction.

However, since the stoppers 8L, 8R are affected by a moment of inertia in the locking direction, the stoppers 8L, 8R are respectively displaced from the regular positions to the lock positions, and therefore the latch releasing members 60L, 60R are blocked from displacing in the respective releasing directions.

As described above, when the upward inertial force acts, the stoppers 8L, 8R are displaced to the respective lock positions, each of the release operations of the latch releasing members 60L, 60R is blocked, and thereby preventing the doors 100L, 100R from releasing.

The foregoing relates to the embodiment of the present invention, but the following various changes and modifications may be added to the present embodiment without departing from the gist of the present invention.

(a) A shape of the stopper 8R of the door latch device 200R fixed to the right door 100R is appropriately changed such that the center of gravity G of the stopper 8R is positioned at the second quadrant. In this case, the center of gravity G of the stopper 8L of the door latch device 200L fixed to the left door 100L is positioned at the first quadrant.

(b) The center of gravity G of the latch releasing member 60R of the door latch device 200R is positioned at the fourth quadrant. In this case, the center of gravity G of the latch releasing member 60L of the door latch device 200L is positioned at the third quadrant.

(c) Each of the centers of gravity G of the latch releasing members 60L, 60R of the door latch devices 200L, 200R is set on the negative region of the y-axis line, and each of the centers of gravity G of the stoppers 8L, 8R of the door latch devices 200L, 200R is set on the positive region of the y-axis line.

(d) The door latch devices 200L, 200R are arranged in the doors respectively such that each of rotation axis directions of the latches 5L, 5R, the latch releasing members 60L, 60R and the stoppers 8L, 8R are oriented to the vertical direction (the direction perpendicular to the transverse direction of the vehicle). In this case, when the latch releasing members 60L, 60R and the stoppers 8L, 8R are seen from the above, the first to fourth quadrants of each of them are defined such that the y-axes passing the respective origin points (rotation centers) O are oriented to the longitudinal direction of the vehicle, wherein the backward direction of each of the y-axes is the positive direction.

What is claimed is:

1. A motor-vehicle door latch device comprising:
 a base member fixed to a door by pluralities of bolts and having an entrance groove where a striker of a vehicle body enters when the door is closed, wherein the door is supported on a side of the vehicle body so as to open and close in a transverse direction of a motor vehicle;
 a latch rotatably supported on the base member by a first shaft to engage with the striker entering in the entrance groove;
 a latch releasing member rotatably supported on the base member by a second shaft, wherein the latch releasing member keeps the door closed state by engaging with the latch meshing with the striker, and opens the door by rotating in a releasing direction to disengage from the latch; and
 a stopper rotatably supported on the base member by a third shaft to swing from a regular position to a lock position against a biasing force of a spring,
 wherein the latch releasing member includes a ratchet that is engagable with the latch and an open lever that rotates the ratchet in a release direction, the ratchet and the open lever are integrally rotatable around the same second shaft,
 wherein due to an action of an inertial force caused by an impact force which is received from a first direction corresponding to a direction in which the striker enters the entrance groove, a center of gravity of the stopper acts in an inward direction of the vehicle, and the stopper rotates from the regular position to the lock position against the biasing force of the spring in order to prevent the latch releasing member from rotating in the releasing direction,
 wherein the stopper is held at the regular position when an inertial force does not act,
 wherein the stopper has a blocking part for blocking a rotation of the open lever of the latch releasing member in the releasing direction by rotating from the regular position to the lock position to enter a rotation locus of the open lever of the latch releasing member,
 wherein a center of gravity of the latch releasing member is positioned in a third or a fourth quadrant among four quadrants of which the origin point is the rotation center of the same second shaft,
 wherein the center of gravity of the stopper at the regular position is positioned in a first or a second quadrant among four quadrants of which the origin point is the rotation center of the stopper, and
 wherein each of the ratchet and the open lever of the latch releasing member has a center of gravity which is positioned to deviate from a rotation center of the same second shaft so that another inertial force caused by another impact force, which is received from a second direction opposite the first direction, acts in an opposite direction to the releasing direction.

2. The motor-vehicle door latch device according to claim 1,
 wherein the base member has pluralities of fixing parts to which the pluralities of bolts are screwed respectively,
 wherein the pluralities of fixing parts comprise a first fixing part upper than the entrance groove, and a second and a third fixing parts which are lower than the entrance groove and are respectively arranged on a vehicle exterior side and a vehicle interior side, and
 wherein the rotation center and the blocking part of the stopper are positioned lower than the entrance groove and between the second fixing part and the third fixing part.

3. The motor-vehicle door latch device according to claim 1, wherein the ratchet and the open lever are formed in an integral structure.

4. The motor-vehicle door latch device according to claim 2, wherein the ratchet and the open lever are formed in an integral structure.

* * * * *